Oct. 9, 1962   E. E. DORKINS   3,057,499
TRAILER TRACTOR FOR RAIL-HIGHWAY FREIGHT TRANSFER EQUIPMENT
Filed Jan. 11, 1961   5 Sheets-Sheet 1

INVENTOR.
Evan E. Dorkins
BY
Fishburn and Gold
ATTORNEYS

Oct. 9, 1962 — E. E. DORKINS — 3,057,499
TRAILER TRACTOR FOR RAIL-HIGHWAY FREIGHT TRANSFER EQUIPMENT
Filed Jan. 11, 1961 — 5 Sheets-Sheet 2
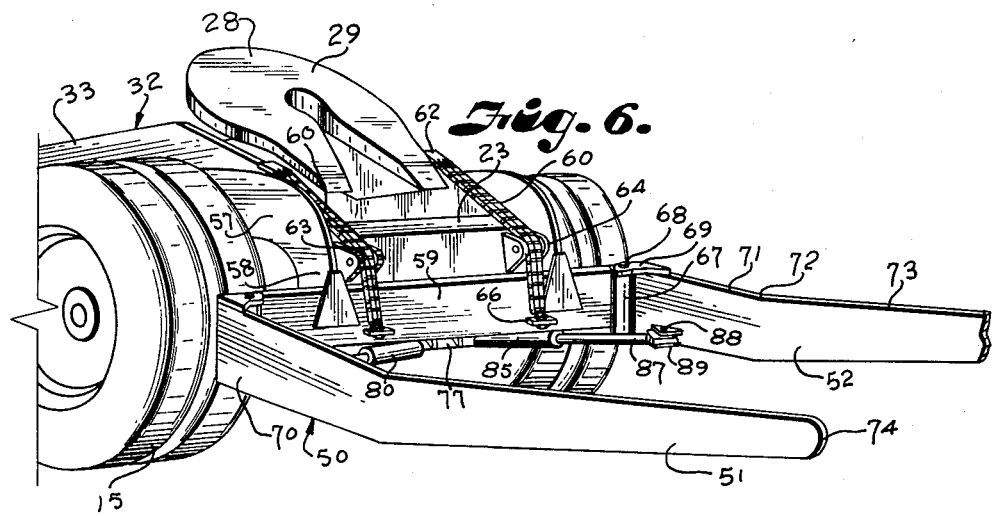
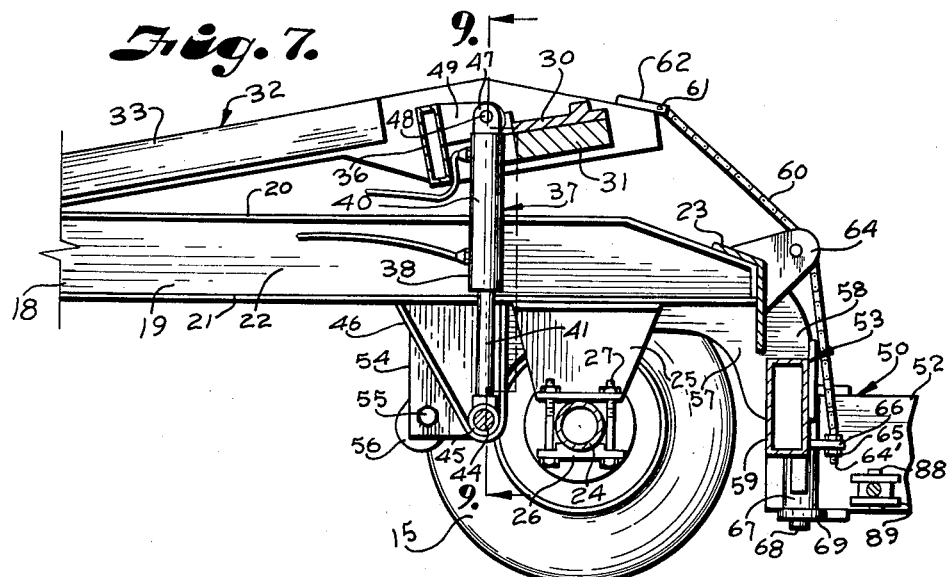
INVENTOR.
EVAN E. DORKINS
BY
Fishburn and Gold
ATTORNEYS INVENTOR.
EVAN E. DORKINS
BY
Fishburn and Gold
ATTORNEYS Oct. 9, 1962 E. E. DORKINS 3,057,499
TRAILER TRACTOR FOR RAIL-HIGHWAY FREIGHT TRANSFER EQUIPMENT
Filed Jan. 11, 1961 5 Sheets-Sheet 4
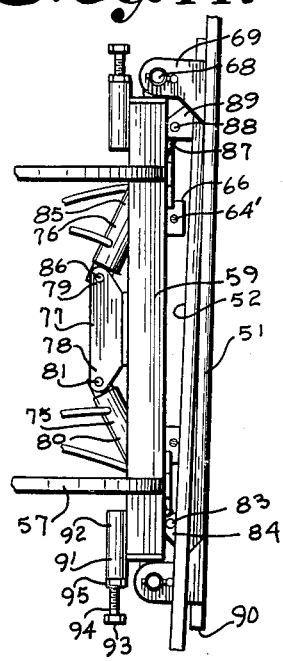
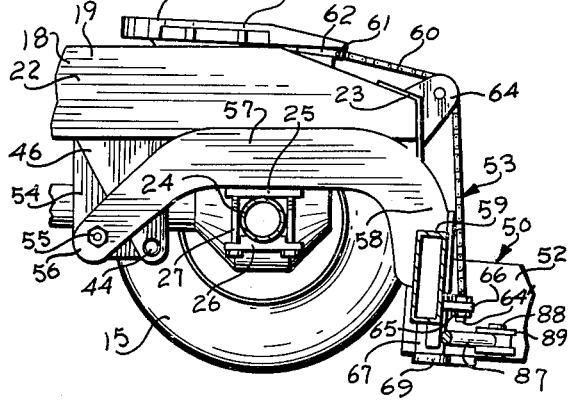
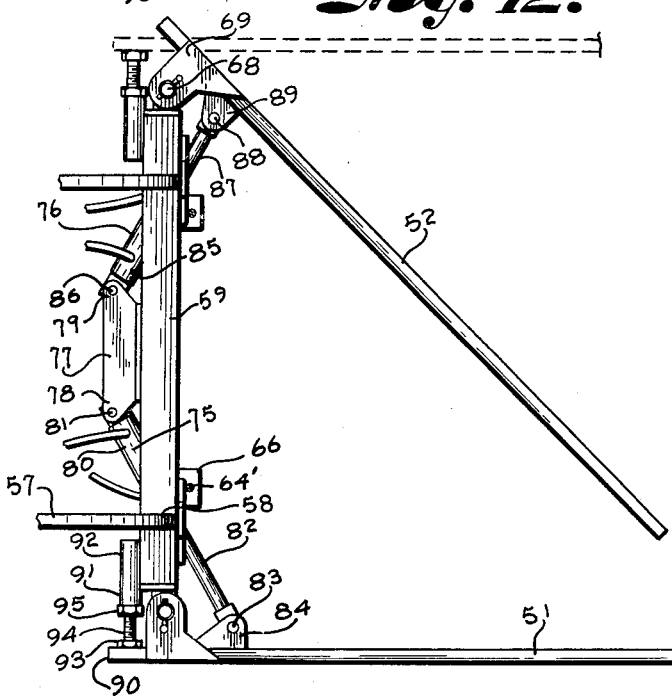
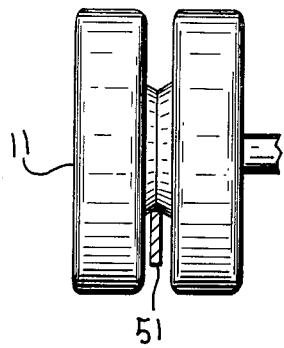
INVENTOR.
EVAN E. DORKINS
BY
Fishburn and Gold
ATTORNEYS

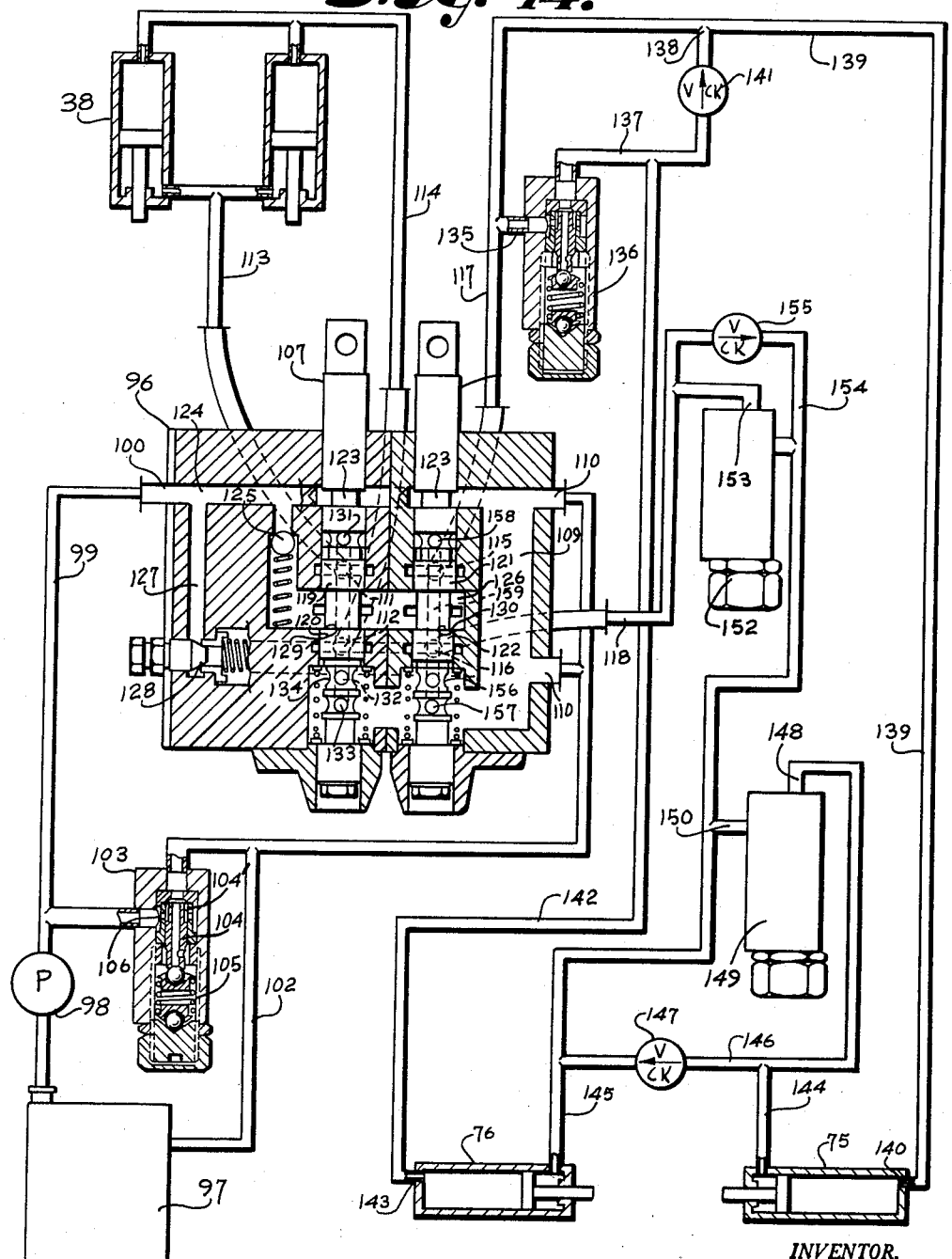

United States Patent Office 3,057,499
Patented Oct. 9, 1962

3,057,499
TRAILER TRACTOR FOR RAIL-HIGHWAY
FREIGHT TRANSFER EQUIPMENT
Evan E. Dorkins, Ottawa, Kans., assignor to Young Spring & Wire Corporation, Detroit, Mich., a corporation of Michigan
Filed Jan. 11, 1961, Ser. No. 82,051
12 Claims. (Cl. 214—653)

This invention relates to mobile vehicular equipment, and more particularly to a tractor unit for towing and maneuvering trailers and transferring freight bodies and the like to and from rail cars and trailer wheel units.

In moving freight, it has been found desirable to use what is termed "piggy-back" hauling wherein loaded trailers and/or trailer bodies for over-the-road or highway use are mounted on rail cars and cargo ships for transportation between ship and rail centers and are then removed for operation over roads or highways to points of delivery. In such a freight system, highway trailers without wheels are carried aboard railway flat cars or cargo ships and, when removed therefrom, are mounted on wheel units called "bogies" and pulled by truck tractor units for all pick-up and delivery service including movement between rail points and truck depots and yards. In the operation of such a system, a flat car equipped with positioning tracks on a rotating and elevatable platform is moved to a point where a road or other suitable surface is alongside a railroad track and at proper elevation and a trailer having a body mounted on bogies is backed up to the flat car into loading position. The platform is turned at right angles to the flat car, the trailer body aligned therewith and then the lock mechanism securing the body to the bogies is released and the trailer body pushed onto the platform and, when positioned thereon, locking mechanism secures the body to the platform. The platform is then rotated to align the trailer body with the flat car, and the platform lowered to traveling position wherein the end portions of the body rest on the decks of the flat car, which is then ready for coupling into a train and movement to a rail center convenient or near the destination of the freight. It has been the practice at the rail terminals to use a conventional over-the-highway truck tractor for such operations and also for maneuvering the bogie alone as by placing a rigid tongue on the bogie and connecting the end thereof remote from the bogie to a hitch on the tractor, and then back the bogie into a precise location and alignment relative to the center of rotation of the platform on the flat car. Such bogies have conventional air brakes which are automatically locked or applied when air connections with a tractor are disconnected. Therefore, in the maneuvering of the bogies relative to the flat car for unloading a trailer body therefrom to form a semi-trailer, it is first necessary to hook up the air system of the tractor to the bogie. After the bogie is backed at a 90-degree angle to the flat car with the bogie sub-frame registering with markings on the side of the car near the turntable to be used, then the air brakes on the bogie are set by use of the trailer brake control in the cab of the tractor. The air line to the bogie is then disconnected, the connector between the tow bar and the tractor hitch is disconnected, and the tractor moved forwardly sufficiently to clear the trailer body when rotated over the bogie, and the tow bar is then removed. The platform on the rail car is then elevated to a sufficient height whereby the body will clear the portions of the flat car and the bogie frame. The platform is then rotated until the body is directly over the bogie, and the body sub-frame is aligned with the bogie frame. The platform is then lowered to lower the trailer body into place where rails of frame members on the body engage the bogie frame. The tractor is then backed until the fifth wheel locks with the kingpin on the trailer body. The locks on the platform are then released and then, by driving the tractor straight forward the body is moved over the bogie for proper relative positioning of same, and then the locks are operated to secure the body to the bogie. The air brakes are again connected whereby the control of the bogie brakes is from the tractor cab. The air brakes on the bogie may then be released and the tractor and trailer pulled away from the flat car, after which the platform on the flat car is rotated to align therewith and is lowered in place whereby the flat car may be moved as desired until needed for loading another trailer body thereon. The connecting and disconnecting of the air brake system on the bogie, the maneuvering of the bogie by means of the tongue into an accurate positioning relative to the flat car, and other maneuvering as well as variation in heights of the ground or road surface near the tracks, all present difficulties and time-consuming operations.

The present invention relates to a trailer tractor for handling and maneuvering bogies and trailer bodies and particularly in such a freight hauling system.

The principal objects of the present invention are to provide a trailer tractor unit for moving bogies and trailer bodies in a manner that eliminates or reduces the disadvantages above-noted; to provide a trailer tractor type mobile vehicle with a fifth wheel structutre mounted for elevation relative to the frame of the tractor and operable at any elevated position for connection or disconnection with a kingpin of a trailer; to provide such a tractor unit with mechanism for engaging a bogie and bodily elevating same and supporting said bogie in elevated position during movement of the tractor over terrain; to provide such bogie-engaging and elevating apparatus with swingably mounted arms that are movable to a position substantially transversely of the tractor frame when not in use and are swingable to extend rearwardly from the tractor for engagement with a bogie; to provide such a structure wherein the bogie elevating arms extend between the tires of dual wheels and engage the wheel structures between the respective tires; to provide such a structure wherein the bogie-engaging arms are positively swung to their positions in a sequential operation whereby one overlies the other when in folded or traveling position of the tractor; to provide such a tractor with hydraulic actuated means for elevating the fifth wheel and bogie lift arms; to provide such a structure wherein the fifth wheel and bogie lift arms are operatively connected for simultaneous elevational movement; and to provide a tractor unit for moving bogies and trailer bodies that is economical to manufacture and efficient in operation for moving and positioning the units to facilitate transfer of trailer bodies to and from rail flat cars and bogie units and move the trailer over the road.

Other objects and advantages of this invention will become apparent from the following description taken in connection with the accompanying drawings wherein are set forth by way of illustration and example certain embodiments of this invention.

FIG. 6 is a partial perspective view of the rear of the tractor with the bogie arms in extended position.

FIG. 7 is a partial vertical sectional view through the rear of the tractor with the fifth wheel and bogie arms in partially elevated position.

FIG. 10 is a vertical sectional view through the rear portion of the tractor with the fifth wheel and bogie arms in lowered position.

FIG. 11 is a partial plan view of the rear of the tractor with the bogie arms in folded or traveling position.

FIG. 12 is a partial plan view of the rear of the tractor with the bogie arms being extended, the fully extended position of one of the arms being shown in broken lines.

FIG. 13 is a transverse sectional view through the bogie lift arm engaged with a wheel of a bogie.

FIG. 14 is a diagrammatic view of the hydraulic mechanism for operating the fifth wheel and bogie lift arms.

Figure 1:
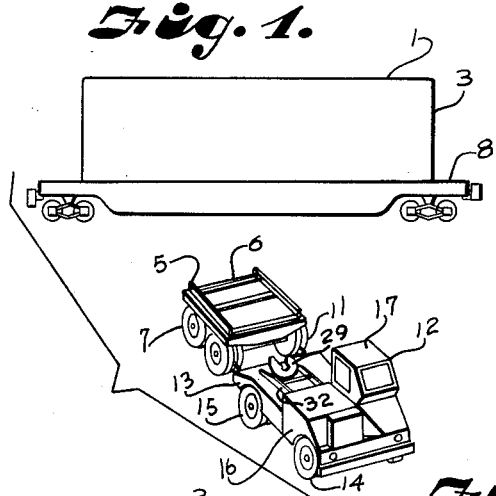
FIG. 1 is a diagrammatic view of a bogie being moved by a tractor unit embodying the features of the present invention alongside a trailer body carried on a flat car.

Referring more in detail to the drawings:

The numeral 1 generally designates a trailer body having a kingpin 2 near its forward end 3 for connection with a fifth wheel of a trailer tractor of conventional type. The body has a sub-frame 4 fixed thereto rearwardly of the kingpin adapted for separable connection to rails 5 of a frame 6 on a bogie 7 whereby when the rear portion of the body is secured in supported relation to the bogie, and the kingpin is attached to a tractor, the structure is in the form of a semi-trailer and may be moved over the highway. The body 1 is of the type adapted to be placed on a rail flat car 8 having an elevatable and rotatable support member 9 for receiving the frame members 4 of the body 1 and, as in customary practice, the body 1 will be suitably secured to the support member 9 which is rotated and lowered to position and secure the body 1 on the flat car 8 with the body 1 extending longitudinally in line with said flat car for transportation on the railroad to some distant destination.

The bogie 7 may be of single or tandem axle structure with dual wheels on each axle wherein the tires 11 of each dual wheel have conventional spacing with metal portions of the wheels extending across the spacing. The bogie also is equipped with conventional brakes (not shown) such as air brakes wherein the brake system has connections for connection to the air brake system of a tractor for operation of the brakes in a conventional manner, the system being such that when the connections are broken or separated, the brakes on the bogie are immediately applied and remain in applied position to hold the bogie stationary until the system is again connected to the air brake system of a tractor and released therefrom. The bogie also has suitable locks for engagement with the frame 4 on the body 1 to retain the body on the bogie in selected position longitudinally of said body.

The structure, as described relative to the body 1, bogie 7 and rail car 8, may be of the type referred to as "Flexi-Van Service" in use on American President Lines and the New York Central Railroad and others, and said structures per se form no part of the present invention.

The numeral 12 generally designates a mobile tractor vehicle for moving and positioning bogies 7 and for connection with the kingpin of a trailer body 1 on and off of rail cars and, also, for moving the bodies as semi-trailers when the bodies are connected to and supported by bogies. The vehicle 12 preferably includes a chassis 13 supported on front and rear wheels 14 and 15 respectively with an engine located within a housing 16 and having suitable driving connection with the rear wheels 15 for moving the vehicle over roads, around dock areas and the like, the front wheels 14 being steered as in conventional practice. The vehicle 12 preferably has a cab 17 in which are located suitable controls for the operator positioned therein to control both the operation of the vehicle and the equipment carried thereon.

The chassis 13 includes a frame 18 having laterally spaced longitudinally extending side frame members 19 preferably in the form of channels with upper and lower flanges 20 and 21 respectively extending inwardly from web portions 22, said side frame members being connected by suitable transverse members and bracing such as a rear cross member 23 to form a rigid structure. While springs may be used between the rear axle 24 and the frame 18 of the vehicle 12 when used for over the highway operation, for operation in areas requiring travel only for short distances and for moving trailers in terminal yards and from rail terminal yards to truck terminal yards, it is preferred that the frame 18 be substantially rigidly connected to the rear axle. In the structure illustrated, the frame side members 19 have depending brackets 25 and the axle 24 is secured thereto by suitable fastening devices such as a bottom plate 26 and bolts 27 which straddle the axle.

Figure 5:
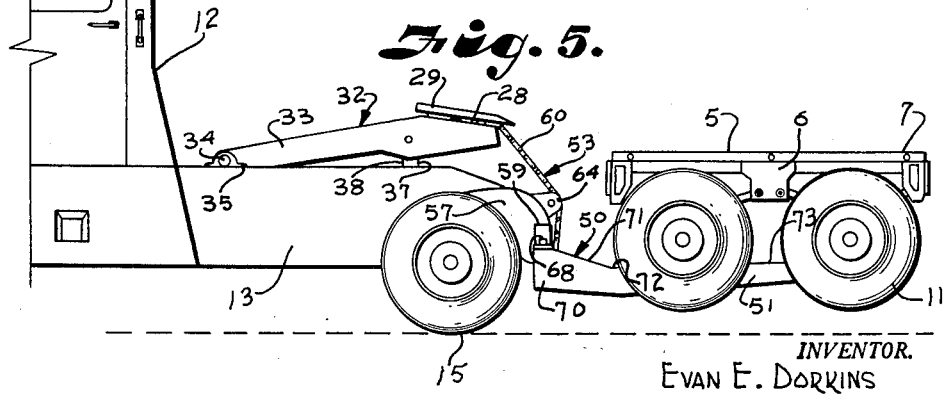
FIG. 5 is a partial side elevational view of the tractor with the bogie supported thereby in elevated position.

A conventional fifth wheel structure 28 is carried on the chassis 13 preferably substantially above the rear axle 24 and is mounted for selective raising and lowering of the fifth wheel relative to the chassis. The raising and lowering of the fifth wheel provides for raising and lowering of the front end of a trailer body connected thereto and also for positioning the height of the fifth wheel to facilitate coupling of the tractor or vehicle with kingpins on trailer bodies where the heights vary due to the terrain or the position of the conventional landing gear that normally supports the forward end of a trailer body when in parked position. In the structure illustrated, the fifth wheel structure has a top plate member 29 pivotally carried on the usual base plate 30 for swinging movement fore and aft and laterally, and said base plate 30 is fixed on a cross member 31 of a lift frame or boom 32. The boom 32 has laterally spaced arms 33 which extend longitudinally of the frame members 19 with said arms positioned between the side frame members 19. The forward ends of the arms 33 are connected to a shaft 34 which extends laterally with end portions rotatably mounted in bearing members 35 fixed on the side frame members 19 adjacent to but rearwardly spaced from the cab 17, as illustrated in FIG. 5, whereby the arms 33 swing up and down and, in lowered position, the rear ends of said arms are between the side frame members 19 to position the fifth wheel upper plate 29 at a minimum height whereby it can be moved under the forward end of a trailer body that is at a height that is merely sufficient to clear the upper edges of the side frames 19.

Figure 9:
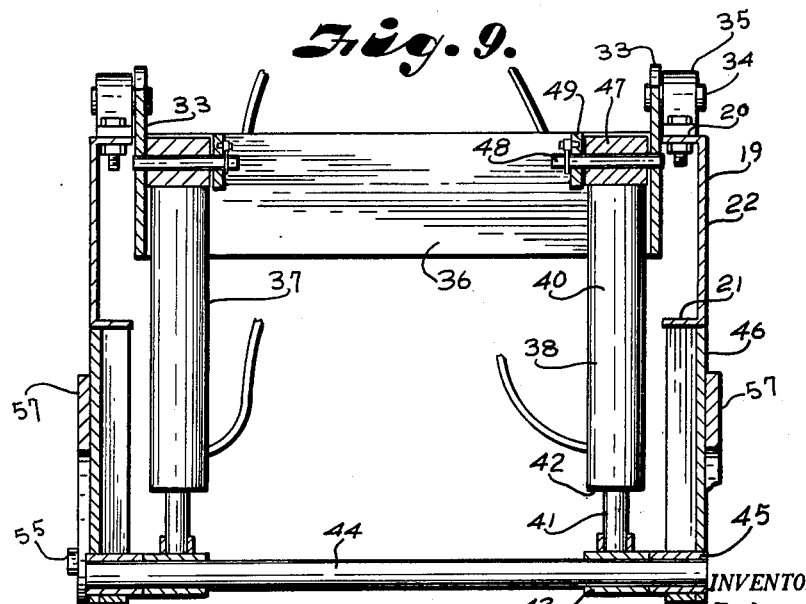
FIG. 9 is a vertical sectional view through the tractor illustrating the fifth wheel elevating mechanism taken on the line 9—9, FIG. 7.

The boom structure 32 preferably has a transverse member 36 connecting the arms 33 in forwardly spaced relation to the support member 31 whereby the boom structure 32 forms a rigid swingable member to carry the fifth wheel 28. Suitable elevating means 37 is mounted on the chassis and connected with the boom structure to effect raising and lowering movement of the fifth wheel. In the structure illustrated, the elevating means is extensible members such as hydraulic rams 38 preferably one at each side to add stability. In the structure illustrated, the hydraulic rams 38 are positioned adjacent to the arms 33 and within the spacing therebetween, as illustrated in FIG. 9. The rams each consist of a cylinder 40 with a piston rod 41 extending from one end 42 thereof and the end of the piston rod having a bearing member 43 pivotally mounted on a shaft 44 which extends transversely of the chassis and has its ends supported in bearing members 45 fixed on the lower ends of brackets 46 rigidly secured to and depending from the side frame members 19 preferably forwardly of the axle 24, as illustrated in FIGS. 7 and 9. The other ends of the cylinders 40 have ears 47 pivotally mounted on pins 48 which are supported by the arms 33 and ears 49 spaced therefrom, said ears being mounted on the transverse member 36 of the boom structure 32 whereby extension of the hydraulic rams 38 will swing the boom structure upwardly to raise the fifth wheel and contraction of the hydraulic rams will lower the boom structure 32 and the fifth wheel 28 carried thereon, the controls of the rams 38 being from inside of the cab 17 as later described, the control of the fifth wheel for coupling and latching same to a kingpin of a trailer body and the unlatching and uncoupling being the same as in conventional practice.

Figure 8:
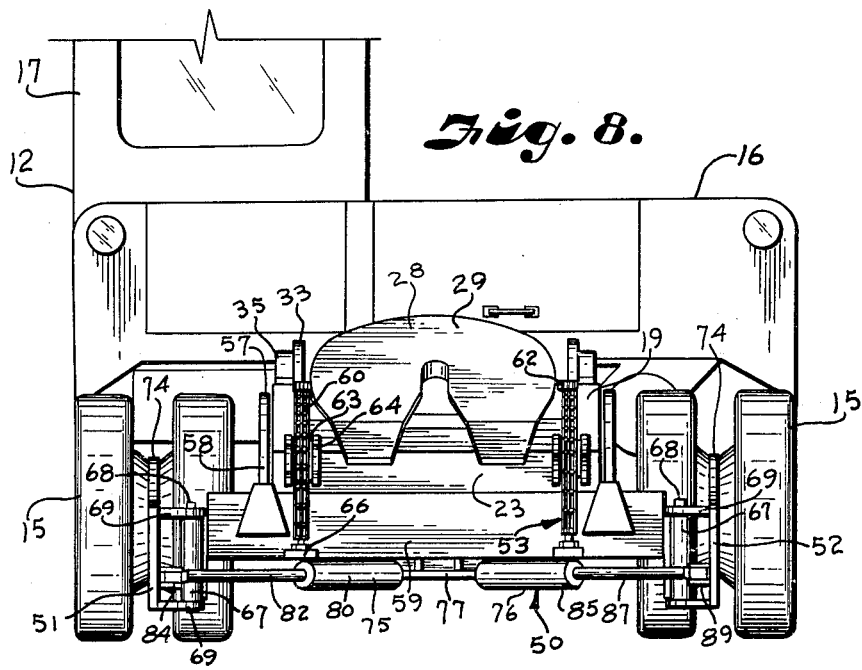
FIG. 8 is a rear elevation of the tractor with the bogie arms extended.

The vehicle 12 is provided with bogie engaging and lifting apparatus generaly designated by the numeral 50 whereby a bogie 7 with the brakes applied or in release position may be bodily lifted and moved to selected positions and set in such position. The vehicle 12 also has conventional brake systems with connections (not shown) and also conventional electrical systems each of which are adapted to connect with the brake system and electrical apparatus on the bogie for operation and control thereof in a conventional manner as is used on an "over-the-road" tractor and semi-trailer. The bogie lift apparatus 50 preferably includes lift arms 51 and 52 movable to extend rearwardly from the vehicle 12 and to engage under portions of the bogie 7 whereby elevating of the arms 51 and 52 will raise the bogie. Elevating mechanism 53 is connected to the lift structure 50 to raise and lower same relative to the chassis. In the structure, illustrated, the brackets 46 have forward extensions 54 carrying suitable bearing pins 55 on which forward end portions 56 of arms 57 are pivoted. The arms 57 extend upwardly and rearwardly from the pivotal mounting over the axle 24 and then downwardly and terminate in rear end portions 58 which are fixed to a cross beam 59. The arms 57 are adjacent to but laterally outwardly of the side frame members 19, as illustrated in FIG. 8. The cross beam 59 extends laterally outwardly from the arms 57 and is rearwardly spaced from the rear wheels 15 of the vehicle 12 and also rearwardly relative to the cross member 23 or rear end of the side frame members 19 of the chassis 18, the arms 51 and 52 being carried by the cross beam 59 as later described.

Suitable hydraulic rams or other lifting means may be connected to the chassis 18 and the lift apparatus 50 for swinging the arms 57 upwardly and downwardly relative to the pivotal mountings thereof and, in the illustrated structure, the elevating mechanism 53 is connected to the fifth wheel boom 32 whereby the hydraulic rams 38 will perform the dual function of raising and lowering the fifth wheel and also raising and lowering the lift arms 51 and 52. Due to the preferred difference in the arc of movement, the connection between the fifth wheel boom and the bogie elevating apparatus 50 is by flexible members as, for example, chains 60 and, for stability, the structure illustrated has two chains with their upper ends pivotally connected as at 61 to a lug 62 on the rear ends of the fifth wheel carrying arms 33, the lug 62 being spaced outwardly and laterally of the fifth wheel. The chains extend downwardly from the fifth wheel supporting frame and over rollers or guides 63 carried on ears 64 fixed on and extending rearwardly from the cross member 23 on the chassis frame 18. The lower ends of the chains are adjustably connected by threaded shanks 64' and nuts 65 to ears 66 fixed on and extending rearwardly from the cross beam 59, as illustrated in FIG. 7, whereby upon upward movement of the fifth wheel by operation of the rams 38, the elevating structure 50 will also move upwardly, and this arrangement does not interfere with normal use as bogies would only be lifted on the arms 51 and 52 and thereby maneuvered by the vehicle 12 when the fifth wheel is disconnected from a trailer body, and any bogie would be set and the arms 51 and 52 disengaged therefrom during any raising or lowering movement of the fifth wheel for purposes of coupling or uncoupling from a trailer body 1.

The cross beam 59 has bearing members 67 fixed thereto adjacent the ends of said beam, and said bearing members carry pivot pins 68 engaged with ears 69 fixed on the ends of the arms 51 and 52 to mount said arms for swinging movement relative to said cross beam 59. When the elevating mechanism 53 is in fully lowered position, the axes of the pins 68 are inclined upwardly and rearwardly relative to the vehicle, and the upper edge 71 of the arms slopes downwardly and rearwardly to a point 72, and then substantially horizontally, as at 73, to the free end 74 of said arms. Also, the vertical dimension or width of the arms is preferably tapered throughout their length whereby the end portions 70 are of greater width for purposes of strength, and the reduced width at the free ends facilitates insertion of the arms between the tires of the dual wheels of a bogie. With this arrangement of the arms when the arms are engaged with a bogie, the wheels thereof adjacent the vehicle 12 will preferably be positioned at or near the point 72, and on raising movement the arms are swung upwardly and the edge portion 73 will slope downwardly from the free ends toward the vehicle 12 whereby gravitational forces acting on the bogie will tend to retain it in position on the arms thereby eliminating any necessity for auxiliary fastening means for holding the bogie in position on the arms.

When the vehicle is used for moving a trailer or for other services when the lift arms 51 and 52 are disengaged from the bogie, said arms are folded into overlying relation to the rear of the cross beam 59. In the structure illustrated the arm 52 is adapted to be folded to extend transversely of the chassis and adjacent the cross beam 59 and the arm 51 is then folded to a transverse position as illustrated in FIG. 11, and the angular relationship of the portions of the arms through their length causes the free ends 74 of said arms to extend above the ears 69 of the other arm so as to provide no interference with the folding movement of the arms. This arrangement requires a sequential operation in moving the arms from folded position to extended position and from extended position to folded position. Suitable power means are used to actuate the arms 51 and 52 and in the illustrated structure the power means is hydraulic jacks 75 and 76. A bracket 77 is fixed to and extends downwardly and forwardly of the cross beam 59 and has laterally spaced ears 78 and 79. One end of a cylinder 80 of the hydraulic ram 75 is pivotally mounted by a suitable pin 81 on the ears 78, said cylinder extending rearwardly and laterally with a piston rod 82 extending from the other end thereof and the free end of said piston rod is pivotally connected by a pin 83 to ears 84 fixed on the arm 51 in rearwardly spaced relation to the pivotal mounting of the arms when in extended position, as illustrated in FIG. 12. The cylinder 85 of the hydraulic ram 76 has one end pivotally mounted by a pin 86 on the ears 79 of the bracket 77. Said cylinder extends rearwardly and laterally with a piston rod 87 extending from the other end of the cylinder, said piston rod having a free end pivotally connected by a pin 88 to ears 89 fixed on the arm 52 in rearwardly spaced relation to the pivotal mounting of said arm. In order to assure the arms extend rearwardly in substantially parallel relation when in extended position, end portions 90 of said arms extend forwardly from the pivotal mounting of said arms and are adapted to engage adjustable stops 91 mounted on the cross beam 59. In the structure illustrated, the adjustable stops consist of threaded sleeves 92 fixed on the cross beam 59 and extending outwardly therefrom and a stop member 93 having a threaded shank 94 threaded into the threaded sleeve with a lock nut 95 to hold the threaded shank in adjusted position relative to the sleeve. The control of the hydraulic rams 38, 75 and 76 and the application of hydraulic fluid to the rams is preferably by a control valve assembly 96 operable from within the cab 17 of the vehicle 12. A suitable arrangement for the hydraulic flow and control is diagrammatically illustrated in FIG. 14. Hydraulic fluid is drawn from a tank 97 by a pump 98 to supply the fluid under pressure through a line 99 to an intake port 100 of the valve assembly 96. A bypass conduit 101 has communication with the conduit 99 downstream from the pump 98 and has connection with a return line 102 leading to the tank 97. The bypass line 101 has located therein a relief valve 103 wherein the valve member 104 normally closes flow through said bypass line under urging by an adjustable spring 105, the piston valve member 104 having an annular portion 104' exposed to pressure through a passage 106 from the conduit 99 whereby the valve in the bypass line will be opened when the force of the pressure acting on said annular portion equals the spring force, as for example, a predetermined maximum pressure of 2,000 pounds per square inch, and with any pressure below the predetermined maximum the bypass line is closed and flow from the pump 98 is through the conduit 99.

The valve assembly 96 is preferably a conventional multiple unit spool type valve structure which, in the illustrated structure, has two control spools or plungers 107 and 108 which in FIG. 14 are illustrated in neutral position. The valve assembly has a passage 109 communicating through outlets 110 to the conduit 102 leading to the tank 97. In the arrangement illustrated, the valve spool 107 controls operation of the hydraulic rams 38 which form the fifth wheel boom lifting rams. The spool 107 controls communication of fluid pressure through ports 111 and 112 to lines 113 and 114, the line 113 communicating with the lower ends of the cylinders of the rams 38 and the line 114 communicating with the upper ends of the rams whereby fluid under pressure delivered through the line 113 with the line 114 exhausting to tank will cause the fifth wheel boom 32 to lower and, when pressure is applied to line 114 and line 113 exhausting to tank, the hydraulic rams and pistons will be elongated, effecting raising of the fifth wheel and boom carrying same. The valve assembly also has ports 115 and 116 communicating with lines 117 and 118 respectively for controlling operation of the hydraulic rams 75 and 76, as later described.

In the structure illustrated, the spools 107 and 108 are substantially identical and, in neutral position, flow through the ports 111, 112, 115 and 116 is blocked by spool portions 119, 120, 121 and 122 respectively, and each of the spools 107 and 108 have grooves 123 to provide communication through a passage 124 from the inlet port 100 to the discharge passage 109. When either of the spools 107 and 108 is shifted in either direction away from neutral position to provide flow to the rams, the grooves 123 are moved out of registry with the passage 124, and adjacent lands on the spool close and block flow through said passage. When such flow is blocked, pressure from the inlet 100 opens a spring-pressed ball check 125 for flow into a passage 126 that communicates with the bores containing both spools 107 and 108. There is also a relief passage 127 and relief valve 128 therein to provide communication from the inlet port 100 to the discharge passage 109 if the pressure should become excessive as, for example, over 2,000 pounds per square inch. The valve 128 serves the same function as valve 103 and while the two in parallel provide added safety against excessive pressure in the system either one may be omitted if desired. In neutral position, the spools 107 and 108 have grooves 129 and 130 registering with the passage 126 and, when it is desired to raise the fifth wheel, the spool 107 is moved downwardly (FIG. 14) whereby the groove 129 provides communication from the passage 126 with the port 112 and a cross bore 131 in the spool moves into registry with the port 111 whereby fluid under pressure from the inlet port 100 flows through the passage 124, valve 125, passage 126, port 112, line 114, to the cylinders of the rams 38, effecting extension of same, and fluid from the other ends of the cylinders flows through the line 113, port 111, cross bore 131, and through an axial bore 132, to cross bores 133 which communicate with the discharge passage 109 whereby the return flow is through the line 102 to the tank 97, thereby effecting lifting of the fifth wheel and, when the desired lift is obtained, the spool 107 is moved to neutral position whereby flow through the ports 112 and 11 is blocked, thereby retaining the hydraulic rams 38 in said desired position.

To lower the fifth wheel, the spool 107 is moved upwardly (FIG. 14) whereby the groove 129 provides communication between the passage 126 and the port 111 for flow of pressure through the line 113 to the cylinders of the rams 38 and return flow from said cylinders is through the line 114, port 112, and through grooves 134 to the discharge passage 109 for return through the line 102 to the tank. With this arrangement, manipulation of the valve spool 107 gives positive control of the lifting and lowering of the fifth wheel 28.

In the opening and folding of the arms 51 and 52, the hydraulic ram 75 moves the arm 51 and the hydraulic ram 76 moves the arm 52, the arms being moved in a sequence whereby when in folded position, as illustrated in FIG. 11, the arm 51 is first moved to open position and then arm 52 is moved to open position, the folding being in the reverse order. The line 117 from the port 115 leads to a branch 135 which connects with a pressure relief valve 136, substantially of the same structure as illustrated relative to the relief valve 103, said relief valve 136 having an outlet connected with the duct 137 that communicates as at 138 with a line 139 that extends from the connection 135 to a port 140 at the end of the cylinder of the ram 75 opposite the piston rod end thereof. A check valve 141 is located in the duct 137 between the pressure relief valve 136 and the line 139, said check valve being such that it blocks flow from the line 139 toward the relief valve but permits flow from the relief valve to the line 139. The relief valve may be set to allow flow therethrough as, for example, when the pressure in the connection 135 is more than 500 pounds per square inch, the flow being closed when the pressure is below the predetermined minimum. The line 142 communicates as at 143 with the cylinder of the hydraulic ram 76 at the end opposite the piston rod end, said line 142 communicating with the duct 137 between the relief valve 136 and the check valve 141, as illustrated in FIG. 14. The piston rod ends of the cylinders of the rams 75 and 76 have communication with lines 144 and 145 respectively, said lines being connected by a conduit 146 having a check valve 147 therein which permits flow of fluid in a direction only from the line 144 to the line 145. The line 144 communicates with the outlet 148 of a pressure relief valve 149 having its inlet connected by a duct 150 with the line 145, the pressure relief valve 149 being substantially of the same structure as illustrated relative to the relief valve 103, and it is preferred that said relief valve be set for flow therethrough from the connection 150 to the outlet 148, said opening for flow being effected at substantially the same pressure as that set for the relief valve 136, namely, 500 pounds per square inch, in the connection 150. The line 145 also communicates with a connection 151 at the inlet of a pressure relief valve 152 which has an outlet connected by a connection 153 with the line 118 that leads to the port 116. The pressure relief valve 152 is preferably of the same structure as illustrated relative to the pressure relief valve 103, with the pressure relief valve 152 set to open for flow from the connection 151 to the connection 153 when the pressure at the connection 151 is at a lesser amount than the pressure required to provide for flow through the pressure relief valves 136 and 149 as, for example, the pressure relief valve 152 may be set for flow therethrough when the pressure at the connection 151 is in the order of 200 pounds per square inch. There is a bypass line 154 between the connections 151 and 153, said bypass line having a check valve 155 therein which permits flow through said bypass line only in the direction from the connection 153 toward the connection 151.

When it is desired to open the arms 51 and 52 from folded position and with the valve spool 108 in neutral position, the spool portions or lands 121 and 122 block flow through the ports 115 and 116 respectively and, if the spool 107 is in neutral position, the flow through the valve assembly 96 is through passage 124 and grooves 123 to the discharge passage 109 and back to the tank through the line 102. To effect opening of the arms 51 and 52, the valve spool 108 is moved upwardly (FIG. 14) whereby the groove 130 provides communication from the passage 126 and port 115 and the groove 123 is moved out of registry with the passage 124 whereby the spool closes flow through said passage, and then flow of fluid under pressure is through the port 100, valve 125, passage 126, port 115, line 117, and line 139, to the port 140 in the cylinder of the hydraulic ram 75 whereby said pressure effects extension of said hydraulic ram to move the arm 51 toward open position. The return flow from the piston rod end of said cylinder of the ram 75 is through the line 144, line 146, check valve 147, line 145, connection 151, relief valve 152, connection 153 and line 118 and port 116 which, in the position of the valve spool 108, communicates with a groove 156 and cross bores 157 for return flow to the discharge passage 109, outlet ports 110 and conduit 102 to the tank 97. During the extension of the ram 75, there is no flow through the relief valve 136 or relief valve 149 because said relief valves do not open until the pressure at the inlet connection thereof is above the pressure required for opening the valve 152. The return flow must be through the valve 152 because the check valve 155 remains closed and prevents flow from the line 154 to the line 118. With this flow arrangement, the return flow from the ram 75 will be applied at the piston rod end of the ram 76, but said pressure merely tends to hold the ram in contracted position, thereby holding the arm 52 in folded position. When the arm 51 is fully opened and further swinging movement thereof prevented by the stop 91, thereby stopping extension of the ram 75, flow through the line 139 will cease, and the pressure having no other outlet from the line 117 will tend to increase until it reaches the opening pressure of the relief valve 136, and then the fluid pressure will flow from line 117 through connection 135, relief valve 136, line 137, and while it could flow through the check valve 141 it could not flow any further because the pressure on both sides of said check valve would be the same. Therefore, the flow from line 137 is through line 142 to the port 143 of the cylinder of the hydraulic ram 76, moving the piston in said cylinder to effect extension of the ram, tending to swing the arm 52 to open position. The return flow from the cylinder at the piston rod end thereof is through line 145 but it cannot flow through the connection 146 due to the check valve 147. Therefore, said return flow through the line 145 will be through the connection 151, relief valve 152, connection 153, and line 118, port 116, groove 156, cross bore 157, discharge passage 109, port 110 and conduit 102 to the tank 97. In this flow, the relief valve 149 remains closed as it is set to open at a higher pressure than that of relief valve 152. When the arm 52 is swung to open position and engages the respective stop, the extension of the ram 76 ceases, but during the opening movement of the arm 52 the pressure acting in ram 76 to effect such opening is also applied to the hydraulic ram 75 to maintain the arm 51 in open position. After the arms are fully opened, it is preferable that the valve spool 108 be returned to neutral position wherein the lands 121 and 122 block flow through the ports 115 and 116 respectively, thereby locking the arms in open position.

When it is desired to fold the arms 51 and 52, the valve spool 108 is moved downwardly (FIG. 14) whereby the groove 130 communicates with the port 116 for flow of fluid pressure from the intake port 100 through the valve 125, passage 126, port 116, line 118, check valve 155, bypass line 154 and line 145, to the piston rod end of the cylinder of hydraulic ram 76. Return flow from the other end of said cylinder is through port 143, line 142, check valve 141, line 139, line 117, port 115, which then registers with a cross bore 158 for flow through an axial bore 159 and cross ports 157 to the discharge passage 109, port 110, and return line 102 to the tank 97. While with this arrangement the port 140 of the ram 75 communicates with the line 139, there is no pressure supply to the other end of the cylinder; therefore, the arm 51 will remain in open position until the arm 52 is swung to closed position wherein it is folded adjacent the cross beam 59. At the end of the contraction of the hydraulic ram 76 in folding arm 52, the pressure in line 118 will increase until it reaches a sufficient amount to effect opening of the relief valve 149 preferably in the order of 500 pounds per square inch. Then the flow will be from line 154, line 145, connection 150, through the relief valve 149, outlet connection 148, line 144, to the piston rod end of the cylinder of the hydraulic ram 75. This pressure can also flow through line 145 to the piston rod end of the cylinder of the ram 76 merely applying additional pressure holding said ram in contracted position and the arm 52 in folded position. The pressure acting on the piston rod end of the cylinder of ram 75 effects movement tending to contract the ram, and return flow from said cylinder is through port 140, line 139, and line 117 to the port 115 and through the valve assembly to the tank, the same as during the folding operation of arm 52. When the arm 51 is moved to folded position and the ram 75 contracted, the same pressure is applied in each ram, and then, on movement of the valve spool 108 to neutral position, the lands 121 and 122 block flow through the ports 115 and 116 thereby holding the pressure in the rams 75 and 76 to hold the arms 51 and 52 in folded position.

Figure 2:
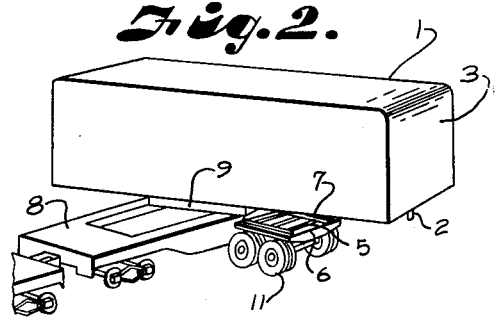
FIG. 2 is a diagrammatic perspective view of the bogie positioned relative to the flat car and the trailer body being swung into unloading position over said bogie.
Figure 3:
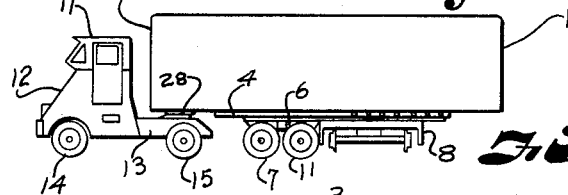
FIG. 3 is a diagrammatic elevational view showing the tractor with the fifth wheel connected to the trailer for drawing the trailer body from the flat car onto the bogie.
Figure 4:
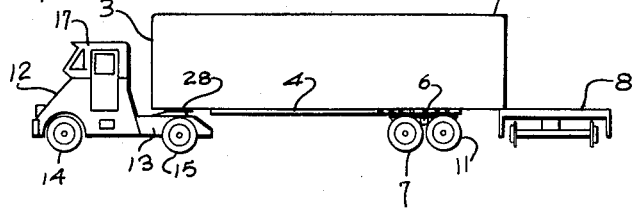
FIG. 4 is a diagrammatic elevational view showing the trailer body connected to the bogie and tractor and being moved from the flat car.

In using a bogie lift and vehicle structure constructed as described, with the trailer body 1 on a flat car to be removed therefrom and moved to some other terminal or other location, and with a bogie set in disconnected relation to a tractor and the brakes locked on said bogie, the vehicle 12 is moved toward the bogie in spaced relation and forwardly of said bogie, and then the fifth wheel being in lowered position the valve spool 108 is moved to provide flow to the rams 75 and 76 to swing the bogie lift arms 51 and 52 to open position. The vehicle 12 is then backed with the lift arms 51 and 52 registering with the spacing between the tires of the dual wheels of the bogie and then further backed whereby the arms 51 and 52 extend between said tires and under the metal portions of the wheels thereof as illustrated in FIG. 13. The valve spool 107 is then manipulated to effect flow of fluid to the rams 38 to swing the fifth wheel boom upwardly and through the flexible connections 60 thereby swing the lift assembly 53 upwardly, raising the bogie 7 bodily from the ground. The vehicle then is backed and maneuvered to a position at right angles to the flat car 8 and to position the bogie accurately to register with the position of the rails 4 on the body 1 when swung to unloading position, as illustrated in FIG. 2. The valve spool 107 is then manipulated to effect lowering of the fifth wheel and the lift arms or assembly 53 to lower the bogie onto the ground with the wheel still braked so it will remain in position as the vehicle 12 is driven straight forwardly to move the arms 51 and 52 from between the tires of the dual wheels on said bogie. The valve spool 108 is then manipulated to effect folding of the lift arms 51 and 52, as above described. The lift or platform 9 on the flat car is then operated to raise the body 1 and is then turned to swing the forward end portion of the body outwardly over the bogie 7 positioned alongside said car, the kingpin extending sufficiently beyond said bogie for engagement with the fifth wheel of a vehicle 12. The platform 9 is then lowered to engage the rails 4 on the body 1 with the bogie frame 5. The vehicle 12 is backed under the forward end of the body 1 and the valve spool 107 manipulated to raise the fifth wheel to the desired position to effect engagement thereof with the kingpin. Then, with the kingpin locked in the fifth wheel, the vehicle 12 is driven forwardly to pull the body from the platform 9 on the flat car 8 outwardly over the bogie until the bogie is under the desired rear portion of said trailer body. The body is then locked to the bogie, and the operator of the vehicle then connects the air brake system and electric system of the vehicle 12 to the bogie 7 and returns to the cab of the vehicle and drives off with the trailer body in the same manner as any tractor trailer operation, the trailer being parked at its destination in a conventional manner.

Generally the reverse of the operations may be followed for moving the trailer body from a bogie onto a flat car, and then the bogie may be moved as desired to another car for loading a body thereon to the bogie. The vehicle 12 moving the bogie bodily provides relative ease in such movement and accurate positioning of same relative to a flat car, materially reducing the time required for moving trailer bodies from semi-trailer structures to flat cars and from flat cars to bogies for forming of semi-trailers.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In a bogie lifting and moving apparatus having a wheel-supported mobile frame, a lift frame mounted on said frame for up and down movement relative thereto and having a portion beyond one end of said mobile frame and extending transversely thereof, elongate lift arms carried by said lift frame and adapted in one position to extend substantially transversely of the mobile frame alongside of said lift frame portion and in overlapping relation to each other, laterally spaced means on said lift frame portion there being one for each arm for mounting one end of the respective arm for movement of said arms from transverse positions to lifting positions substantially longitudinally of the frame and extending oppositely from the lift frame portion relative to said mobile frame, power means on said lift frame and operatively connected with said lift arms for moving said arms between said transverse positions and longitudinal lifting positions, said arms when in longitudinal position relative to the mobile frame beng substantially parallel and laterally spaced whereby free ends thereof are insertable under portions of a bogie to be moved in response to relative longitudinal movement of the mobile frame and bogie for effecting lifting engagement therewith, and means on said mobile frame and operatively connected with said lift frame for effecting up and down movement of said lift frame and the arms carried thereby for raising and lowering a bogie engaged by said arms.

2. In a bogie lifting and moving apparatus having a wheel-supported frame, a boom structure mounted on said frame for up and down movement relative thereto and having a portion extending beyond one end of said frame, a beam on said boom portion and extending transversely relative to said frame, elongate lift arms carried by said boom and adapted in one position to extend substantially transversely of the frame alongside of the boom beam and in overlapping relation to each other, laterally spaced means on said beam there being one for each lift arm for mounting one end of the respective lift arms for movement of said arms from transverse positions to a lifting position substantially longitudinally of the frame and extending oppositely from the beam relative to said frame, power means on said boom and operatively connected with said lift arms for moving said arms between said transverse positions and longitudinal lifting positions, said arms when in longitudinal position relative to the frame being substantially parallel and laterally spaced whereby free ends thereof are insertable under portions of a bogie to be moved in response to relative longitudinal movement of said frame and bogie for effecting lifting engagement therewith, and power means on said frame and operatively connected with said boom for effecting up and down movement of said boom and the arms carried thereby for raising and lowering a bogie engaged by said arms for movement of said bogie with said wheel supported frame when the bogie is in lifted position.

3. In a bogie lifting and moving apparatus having a wheel-supported frame, a boom structure having spaced arms extending longitudinally of said frame and laterally outwardly thereof with said arms having end portions extending beyond one end of said frame, a beam fixed on said boom portions and extending transversely relative to said frame, means mounting other end portions of said arms relative to said frame for up and down movement of said boom relative to said frame, elongate lift arms carried by said boom, laterally spaced means on said beam there being one for each lift arm for mounting one end of the respective lift arm on said beam for movement of said lift arms from a folded position wherein the lift arms lie alongside of each other and transversely of the frame to an open lifting position whereing said lift arms are longitudinally of the frame and extending oppositely from the beam relative to said frame, power means on said boom and operatively connected with said lift arms for moving said lift arms between said folded positions and open lifting positions, said arms when in open lifting position relative to the frame being substantially parallel and laterally spaced whereby free ends thereof are insertable under portions of a bogie to be moved in response to relative longitudinal movement of said frame and bogie for effecting lifting engagement therewith, and power means on said frame and operatively connected with said boom for effecting up and down movement of said boom and the arms carried thereby for raising and lowering a bogie engaged by said arms for movement of said bogie with said wheel supported frame when the bogie is in lifted position.

4. A bogie-moving apparatus comprising, a mobile vehicle having a wheel-supported frame and a source of fluid pressure thereon, a boom including spaced side members extending longitudinally of said frame and having ends extending beyond one end of said frame, a beam spaced from said one end of the frame and extending transversely thereof and rigidly connecting said side members, means on said frame in spaced relation to said one end thereof pivotally mounting the side members of said boom for up and down swinging movement of said boom, means on said frame and connected with said boom for swinging said boom up and down relative to said frame, elongate lift arms each having an end portion pivotally mounted on said beam in spaced relation transversely of said frame for swinging movement of said lift arms from a folded position wherein said arms are substantially transversely of said frame and alongside of said beam and in overlapping relation to each other to an open lifting position wherein said arms extend oppositely from said beam relative to said frame and substantially longitudinally thereof, said lift arms in open position being substantially parallel and spaced apart whereby upon movement of the vehicle the free ends of said lift arms may be inserted under and engage spaced portions of a bogie to be lifted, a separate extensible device for each lifting arm and interconnecting the lifting arm and the beam for swinging said arms from folded to open lifting positions, said devices each including a hydraulic cylinder having a double-acting reciprocable piston therein, and means including a control valve and pressure-responsive valves connecting the source of fluid pressure with said hydraulic cylinders for swinging said lift arms one at a time in sequence.

5. A bogie-moving apparatus comprising, a mobile vehicle having a wheel-supported frame and a source of fluid pressure thereon, a boom including spaced side members extending longitudinally of said frame having ends extending beyond one end of said frame, a beam spaced from said one end of the frame and extending transversely thereof and rigidly connecting said side members, means on said frame in spaced relation to said one end thereof pivotally mounting the side members of said boom for up and down swinging movement of said boom, an extensible member having one end connected with said frame, means interconnecting the other end of said extensible member relative to said boom, said extensible device including a hydraulic cylinder having a reciprocable piston therein, means including a control valve connecting the source of fluid pressure with said hydraulic cylinder for effecting up and down swinging movement of said boom, lift arms each having an end portion pivotally mounted on said beam in spaced relation transversely of said frame for swinging movement of said lift arms from a folded position alongside of said beam and each other to an open position whereby said arms extend oppositely from said beam relative to said frame and substantially longitudinally thereof, stop means carried by said boom and engageable by said lift arms to limit swinging movement away from the beam whereby at the end of outward swinging movement of the lift arms they are substantially parallel and spaced apart whereby upon movement of the vehicle the free ends of said lift arms may be inserted under and engage spaced portions of a bogie to be lifted, a separate extensible device for each lifting arm and interconnecting the lifting arm and the beam for swinging said arms from folded to open positions, said devices each including a hydraulic cylinder having a double-acting reciprocable piston therein, and means including a second control valve and pressure-responsive valves connecting the source of fluid pressure with said hydraulic cylinders of said extensible devices for effecting swinging of said lift arms.

6. In a mobile vehicle for moving trailers and bogies therefor and having a wheel-supported frame, a boom structure pivotally mounted on said frame for up and down swinging movement relative thereto, said boom structure extending from the pivotal mounting longitudinally toward one end of said frame, a fifth wheel carried on said boom in spaced relation to the pivotal mounting thereof, means interconnecting the frame and said boom and operable to effect swinging movement of said boom, a second boom including spaced side members extending longitudinally of said frame having ends extending beyond one end of said frame, a beam spaced from said one end of the frame and extending transversely thereof and rigidly connecting said side members, means on said frame in spaced relation to said one end thereof mounting the side members of said second boom for up and down movement of said second boom, means operatively connected with said second boom for effecting up and down movement thereof, lift arms each having an end portion mounted on said beam in spaced relation transversely of said frame for movement of said lift arms from a folded position alongside of said beam and each other to an open position whereby said arms extend oppositely from said beam relative to said frame and substantially longitudinally thereof, said lift arms in open position being substantially parallel and spaced apart whereby upon movement of the vehicle the free ends of said lift arms may be inserted under and engage spaced portions of a bogie to be lifted, and power means on said second boom and operatively connected with said lift arms for moving said lift arms to and from folded and open positions.

7. In a mobile vehicle for moving trailers and bogies therefor and having a wheel-supported frame and a source of fluid pressure thereon, a boom structure pivotally mounted on said frame for up and down swinging movement relative thereto, said boom structure extending from the pivotal mounting longitudinally toward one end of said frame, a fifth wheel carried on said boom in spaced relation to the pivotal mounting thereof, an extensible means interconnecting the frame and said boom and operable to effect swinging movement of said boom, a second boom including spaced side members extending longitudinally of said frame having ends extending beyond one end of said frame, a beam spaced from said one end of the frame and extending transversely thereof and rigidly connecting said side members, means on said frame in spaced relation to said one end thereof pivotally mounting the side members of said second boom for up and down swinging movement of said second boom, means operatively connected with said second boom for effecting up and down swinging movement thereof, lift arms each having an end portion mounted on said beam in spaced relation transversely of said frame for movement of said lift arms from a folded position alongside of said beam and each other to an open position whereby said arms extend oppositely from said beam relative to said frame and substantially longitudinally thereof, said lift arms in open position being substantially parallel and spaced apart whereby upon movement of the vehicle the free ends of said lift arms may be inserted under and engage spaced portions of a bogie to be lifted, a separate extensible device for each lift arm and interconnecting the respective lift arm and the second boom for moving said lift arms from folded to open positions, and means including valves connecting the source of fluid pressure with said extensible devices for moving said lift arms.

8. In a mobile vehicle for moving trailers and bogies therefor and having a wheel-supported frame and a source of fluid pressure thereon, a boom structure pivotally mounted on said frame for up and down swinging movement relative thereto, said boom structure extending from the pivotal mounting longitudinally toward one end of said frame, a fifth wheel carried on said boom in spaced relation to the pivotal mounting thereof, an extensible means interconnecting the frame and said boom and operable to effect swinging movement of said boom, a second boom including spaced side members extending longitudinally of said frame having ends extending beyond one end of said frame, a beam spaced from said one end of the frame and extending transversely thereof and rigidly connecting said side members, means on said frame in spaced relation to said one end thereof pivotally mounting the side members of said second boom for up and down swinging movement of said second boom, means interconnecting said first and second booms whereby said second boom swings up and down in response to up and down swinging movement of the first named boom, lift arms each having an end portion pivotally mounted on said beam in spaced relation transversely of said frame for swinging movement of said lift arms from a folded position alongside of said beam and each other to an open position whereby said arms extend oppositely from said beam relative to said frame and substantially longitudinally thereof, stop means carried by said second boom and engageable by said lift arms to limit swinging movement away from the beam whereby at the end of outward swinging movement of the lift arms they are substantially parallel and spaced apart and upon movement of the vehicle the free ends of said lift arms may be inserted under and engage spaced portions of a bogie to be lifted, a separate extensible device for each lift arm and interconnecting the respective lift arm and the second boom for swinging said lift arms from folded to open positions, said devices each including a hydraulic cylinder having a double-acting reciprocable piston therein, and means including a control valve and pressure-responsive valves connecting the source of fluid pressure with said hydraulic cylinders for swinging said lift arms one at a time in sequence.

9. In a mobile vehicle for moving trailers and bogies therefor and having a wheel-supported frame and a source of fluid pressure thereon, a boom structure pivotally mounted on said frame for up and down swinging movement relative thereto, said boom structure extending from the pivotal mounting longitudinally toward one end of said frame, a fifth wheel carried on said boom in spaced relation to the pivotal mounting thereof, and extensible means interconnecting the frame and said boom and operable to effect swinging movement of said boom, said extensible means including a hydraulic cylinder with a reciprocable piston therein, means including a control valve connecting the source of fluid pressure with said hydraulic cylinder for effecting up and down swinging movement of said boom, a second boom including spaced side members extending longitudinally of said frame having ends extending beyond one end of said frame, a beam spaced from said one end of the frame and extending transversely thereof and rigidly connecting said side members, means on said frame in spaced relation to said one end thereof pivotally mounting the side members of said second boom for up and down swinging movement of said second boom, lift arms each having an end portion pivotally mounted on said beam in spaced relation transversely of said frame for swinging movement of said lift arms from a folded position alongside of said beam and each other to an open position whereby said arms extend oppositely from said beam relative to said frame and substantially longitudinally thereof, stop means carried by said boom and engageable by said lift arms to limit swinging movement away from the beam whereby at the end of outward swinging movement of the lift arms they are substantially parallel and spaced apart and upon movement of the vehicle the free end of said lift arms may be inserted under and engage spaced portion of a bogie to be lifted, a separate extensible device for each lift arm and interconnecting the respective lift arm and the second boom for swinging said lift arms from folded to open positions, said devices each including a hydraulic cylinder having a double-acting reciprocable piston therein, and means including a control valve and pressure-responsive valves connecting the source of fluid pressure with said hydraulic cylinders for swinging said lift arms one at a time in sequence, and means interconnecting said fifth wheel boom and the second boom whereby up and down swinging movement of said fifth wheel boom swings the second boom up and down respectively.

10. In a mobile vehicle for moving trailers and bogies therefor and having a wheel-supported frame and a source of fluid pressure thereon, a boom, means pivotally mounting one end of said boom on said frame in spaced relation to one end of said frame whereby said boom extends longitudinally of the frame toward said one end and is swingable up and down relative thereto, a trailer fifth wheel structure carried on said boom in spaced relation to the pivotal mounting means thereof, a second boom including spaced side members extending longitudinally of said frame with one end portion spaced outwardly from said one end of the frame, means pivotally mounting the other end portions of the side members of the second boom on said frame for up and down swinging movement relative to said frame, a rigid beam fixed to said one end portion of the side members and extending transversely of the frame in spaced relation to said one end of the frame and below the fifth wheel boom, a pair of lift arms each having a free end, means pivotally mounting the other ends of the lift arms on the beam of the second boom for swinging movement from folded to open positions, the pivotal mounting means of said lift arms being spaced transversely of said frame and said lift arms in folded position extending along said beam with one arm between the other arm and said beam, stop means on said beam and engageable to limit outward swinging movement of said lift arms to open position whereby in open position said arms are laterally spaced and substantially parallel with the free ends extending outwardly oppositely from the beam and upon movement of the vehicle the free ends of the arms may be moved below portions of a bogie for engaging and lifting same, extensible means interconnecting the fifth wheel boom and the frame and operable to swing said second boom up and down relative to said frame, flexible means interconnecting the fifth wheel boom and the second boom in spaced relation to the pivotal mounting means of said respective booms whereby the second boom and lift arms thereon are swung up and down in response to up and down swinging movement of the fifth wheel boom, an extensible device for each lift arm and interconnecting the respective lift arm and the beam of the second boom and operable to swing the respective lift arms, said extensible devices each including a hydraulic cylinder having a double-acting reciprocable piston therein, and means including a control valve connecting the source of fluid pressure with said hydraulic cylinders and operative for swinging said lift arms in sequence to and from open and folded positions.

11. In a mobile vehicle for moving trailers and bogies therefor and having a wheel-supported frame and a source of fluid pressure thereon, a boom including spaced side members extending longitudinally of said frame with one end portion spaced outwardly from said one end of the frame, means pivotally mounting the other end portions of the side members of the boom on said frame for up and down swinging movement relative to said frame, a rigid beam fixed to said one end portion of the side members and extending transversely of the frame in spaced relation to said one end of the frame, a pair of lift arms each having a free end, means pivotally mounting the other ends of the lift arms on the beam of the boom for swinging movement from folded to open positions, the pivotal mounting means of said lift arms being spaced transversely of said frame and said lift arms in folded position extending along said beam with one arm between the other arm and said beam, stop means on said beam and engageable to limit outward swinging movement of said lift arms to open position whereby in open position said arms are laterally spaced and substantially parallel with the free ends extending outwardly oppositely from the beam whereby upon movement of the vehicle the free ends of the arms may be moved below portions of a bogie for engaging and lifting same, extensible means on said frame and having connection with said boom and operable to swing said boom up and down relative to said frame, an extensible device for each lift arm and interconnecting the respective lift arm and the beam of the boom and operable to swing the respective lift arms, said extensible devices each including a hydraulic cylinder having a double-acting reciprocable piston therein, flow conduits connecting the source of fluid pressure to the hydraulic cylinders of said extensible devices, a control valve in said flow conduits for controlling application of fluid pressure through said conduits, valves in said conduits operative to permit flow of fluid pressure therethrough in response to predetermined pressures from said source of fluid pressure with one of said valves responsive to a lesser fluid pressure than the other of said valves whereby actuation of the control valve for fluid pressure flow through said conduits effects flow of fluid pressure to one of said extensible devices for operation to swing one of said arms from folded to open position and upon said one arm reaching the end of its swinging movement to open position a valve responsive to a higher fluid pressure effects flow of pressure to the other of said extensible devices to effect swinging movement of the other arm from folded to open position and actuation of the control valve to reverse the application of fluid pressure effects folding swinging movement of said arms one at one a time in sequence.

12. In a mobile vehicle for moving trailers and bogies therefor and having a wheel-supported frame and a source of fluid pressure thereon, a boom, means pivotally mounting one end of said boom on said frame in spaced relation to one end of said frame whereby said boom extends longitudinally of the frame toward said one end and is swingable up and down relative thereto, a trailer fifth wheel structure carried on said boom in spaced relation to the pivotal mounting means thereof, a second boom including spaced side members extending longitudinally of said frame with one end portion spaced outwardly from said one end of the frame, means pivotally mounting the other end portions of the side members of the second boom on said frame for up and down swinging movement relative to said frame, a rigid beam fixed to said one end portion of the side members and extending transversely of the frame in spaced relation to said one end of the frame and below the fifth wheel boom, a pair of lift arms each having a free end, means pivotally mounting the other ends of the lift arms on the beam of the second boom for swinging movement from folded to open positions, the pivotal mounting means of said lift arms being spaced transversely of said frame and said lift arms in folded position extending along said beam with one arm between the other arm and said beam, stop means on said beam and engageable to limit outward swinging movement of said lift arms to open position whereby in open position said arms are laterally spaced and substantially parallel with the free ends extending outwardly opositely from the beam whereby upon movement of the vehicle the free ends of the arms may be moved below portions of a bogie for engaging and lifting same, extensible means interconnecting the fifth wheel boom and the frame and operable to swing said second boom up and down relative to said frame, flexible means interconnecting the fifth wheel boom and the second boom in spaced relation to the pivotal mounting means of said respective booms whereby the second boom and lift arms thereon are swung up and down in response to up and down swinging movement of the fifth wheel boom, an extensible device for each lift arm and interconnecting the respective lift arm and the beam of the second boom and operable to swing the respective lift arms, said extensible devices each including a hydraulic cylinder having a double-acting reciprocable piston therein, flow conduits connecting the source of fluid pressure to the hydraulic cylinders of said extensible devices, a control valve in said flow conduit for controlling application of fluid pressure through said conduits, valves in said conduits operative to permit flow of fluid pressure therethrough in response to predetermined pressures from said source of fluid pressure with one of said valves responsive to a lesser fluid pressure than the other of said valves whereby actuation of the control valve for fluid pressure flow through said conduits effects flow of fluid pressure to one of said extensible devices for operation to swing one of said arms from folded to open position and upon said one arm reaching the end of its swinging movement to open position a valve responsive to a higher fluid pressure effects flow of pressure to the other of said extensible devices to effect swinging movement of the other arm from folded to open position and actuation of the control valve to reverse the application of fluid presure effects folding swinging movement of said arms one at a time in sequence.

References Cited in the file of this patent
UNITED STATES PATENTS 2,821,317     Locke _____ Jan. 18, 1958
2,978,128     Polich _____ Apr. 4, 1951